United States Patent
Fang

(10) Patent No.: US 9,904,751 B2
(45) Date of Patent: Feb. 27, 2018

(54) COMPUTER-IMPLEMENTED METHOD OF DESIGNING A MODULARIZED STACKED INTEGRATED CIRCUIT

(71) Applicant: MediaTek Inc., Hsin-Chu (TW)

(72) Inventor: Jia-Wei Fang, Hsinchu (TW)

(73) Assignee: MEDIATEK INC., Hsin-Chu (TW)

(*) Notice: Subject to any disclaimer, the term of this patent is extended or adjusted under 35 U.S.C. 154(b) by 28 days.

(21) Appl. No.: 14/743,066

(22) Filed: Jun. 18, 2015

(65) Prior Publication Data

US 2016/0203253 A1    Jul. 14, 2016

Related U.S. Application Data

(60) Provisional application No. 62/102,209, filed on Jan. 12, 2015.

(51) Int. Cl.
*G06F 17/50* (2006.01)

(52) U.S. Cl.
CPC ...... *G06F 17/5072* (2013.01); *G06F 17/5077* (2013.01); *G06F 17/5081* (2013.01); *G06F 17/50* (2013.01); *G06F 17/5045* (2013.01); *G06F 17/5068* (2013.01); *G06F 2217/40* (2013.01)

(58) Field of Classification Search
CPC ............ G06F 17/5081; G06F 17/5045; G06F 17/5068; G06F 17/5072; G06F 17/5077; G06F 17/50; G06F 2217/40
See application file for complete search history.

(56) References Cited

U.S. PATENT DOCUMENTS

| | | | | |
|---|---|---|---|---|
| 4,815,003 A * | 3/1989 | Putatunda | ........... | G06F 17/5077 716/123 |
| 8,146,032 B2 * | 3/2012 | Chen | ................... | G06F 17/5036 716/101 |
| 8,266,560 B2 * | 9/2012 | McIlrath | ............. | G06F 17/5045 707/790 |
| 8,402,404 B1 * | 3/2013 | Mehta | ..................... | G06F 17/50 716/104 |
| 2013/0014070 A1 * | 1/2013 | Su | ........................ | G06F 17/5036 716/115 |
| 2013/0290914 A1 * | 10/2013 | Chuang | ............... | G06F 17/5072 716/55 |
| 2013/0295727 A1 * | 11/2013 | Hsu | ................... | H01L 23/49827 438/130 |
| 2015/0234979 A1 * | 8/2015 | Mehta | ................. | G06F 17/5081 716/107 |

* cited by examiner

*Primary Examiner* — Helen Rossoshek
(74) *Attorney, Agent, or Firm* — McClure, Qualey & Rodack, LLP

(57) ABSTRACT

The invention provides a method of designing an integrated circuit. The method includes providing a physical layout group including a first layout corresponding to a first die having a first function. A second layout corresponds to an interposer configured for the first die connected thereon. The first physical layout group is partitioned into a first physical layout partition according to the first function. A first automatic place-and-route (APR) process is performed to obtain a first hierarchical layout according to the first physical layout partition. A first verification is performed on the first hierarchical layout.

11 Claims, 9 Drawing Sheets

COMPUTER-IMPLEMENTED METHOD OF DESIGNING A MODULARIZED STACKED INTEGRATED CIRCUIT

CROSS REFERENCE TO RELATED APPLICATIONS

This application claims the benefit of U.S. Provisional Application No. 61/102,209, filed on Jan. 12, 2015, the entirety of which is incorporated by reference herein.

BACKGROUND OF THE INVENTION

Field of the Invention

The present invention relates to a physical design of integrated circuits, and in particular to a physical design of 2.5-dimensional (2.5D) and/or three-dimensional (3D) integrated circuits.

Description of the Related Art

A 2.5-dimensional integrated circuit (2.5D IC) is a package with an active electronic component (e.g. a die or a chip) stacked on an interposer through conductive bumps. A three-dimensional integrated circuit (3D IC) is a package with a plurality of active electronic components stacked vertically through the use of through-silicon vias (TSVs) to form a single integrated circuit. The stacked die may be then packaged such that I/Os can provide connection to the 3D IC.

A 2.5D IC and/or 3D IC provides a solution for multi-functional, highest-margin, highest-volume designs with faster speeds. However, a 2.5D IC and/or 3D IC also faces challenges including complex designs of each active electronic component. Also, the integration of the stacked active electronic components or the integration of the active electronic component and the interposer generates design challenges. Conventional solutions implement the active electronic components (e.g. dies or chips), the interposer, and the TSVs separately. An assembly of the active electronic components, interposer, and TSVs is then fabricated to do physical verifications. In the interposer, however, the huge amount of digital, analog, and DDR connections makes it so that routings cannot be completed as automatic chip-level routings or manual substrate routings. Mismatched in the resulting 2.5D IC and/or 3D IC designs may occur, especially in the physical connections and the electrical connections between the active electronic component and the interposer.

Thus, a novel physical design of 2.5D IC and/or 3D IC is desirable.

BRIEF SUMMARY OF THE INVENTION

A method of designing an integrated circuit is provided. An exemplary embodiment of a method of designing an integrated circuit includes providing a physical layout group including a first layout corresponding to a first die having a first function. A second layout corresponds to an interposer configured for the first die connected thereon. The first physical layout group is partitioned into a first physical layout partition according to the first function. A first automatic place-and-route (APR) process is performed to obtain a first hierarchical layout according to the first physical layout partition. A first verification is performed on the first hierarchical layout.

Another exemplary embodiment of a method of designing an integrated circuit includes a lead frame including obtaining a first netlist corresponding to a first die. A second netlist corresponding to an interposer provided for the first die connected thereon is obtained. The first netlist is partitioned into a third netlist according to a first function. The second netlist is partitioned into a fourth netlist according to the first function. A first automatic place-and-route (APR) process according to the third netlist and the fourth netlist is performed to obtain a first hierarchical netlist. A first hierarchical netlist is verified.

Yet another exemplary embodiment of a method of designing an integrated circuit includes a lead frame including obtaining a first netlist corresponding to a first die having a first function and a second function. A second netlist corresponding to an interposer provided for the first die connected thereon is obtained. A third netlist is obtained by partitioning the first netlist and the second netlist according to the first function. A fourth netlist is obtained by partitioning the first netlist and the second netlist according to the second function. A first automatic place-and-route (APR) process according to the third netlist is performed to obtain a first hierarchical netlist. A second automatic place-and-route (APR) process according to the fourth netlist is performed to obtain a second hierarchical netlist. The first hierarchical netlist and the second hierarchical netlist are merged to obtain a merged hierarchical netlist. The merged hierarchical netlist is verified.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
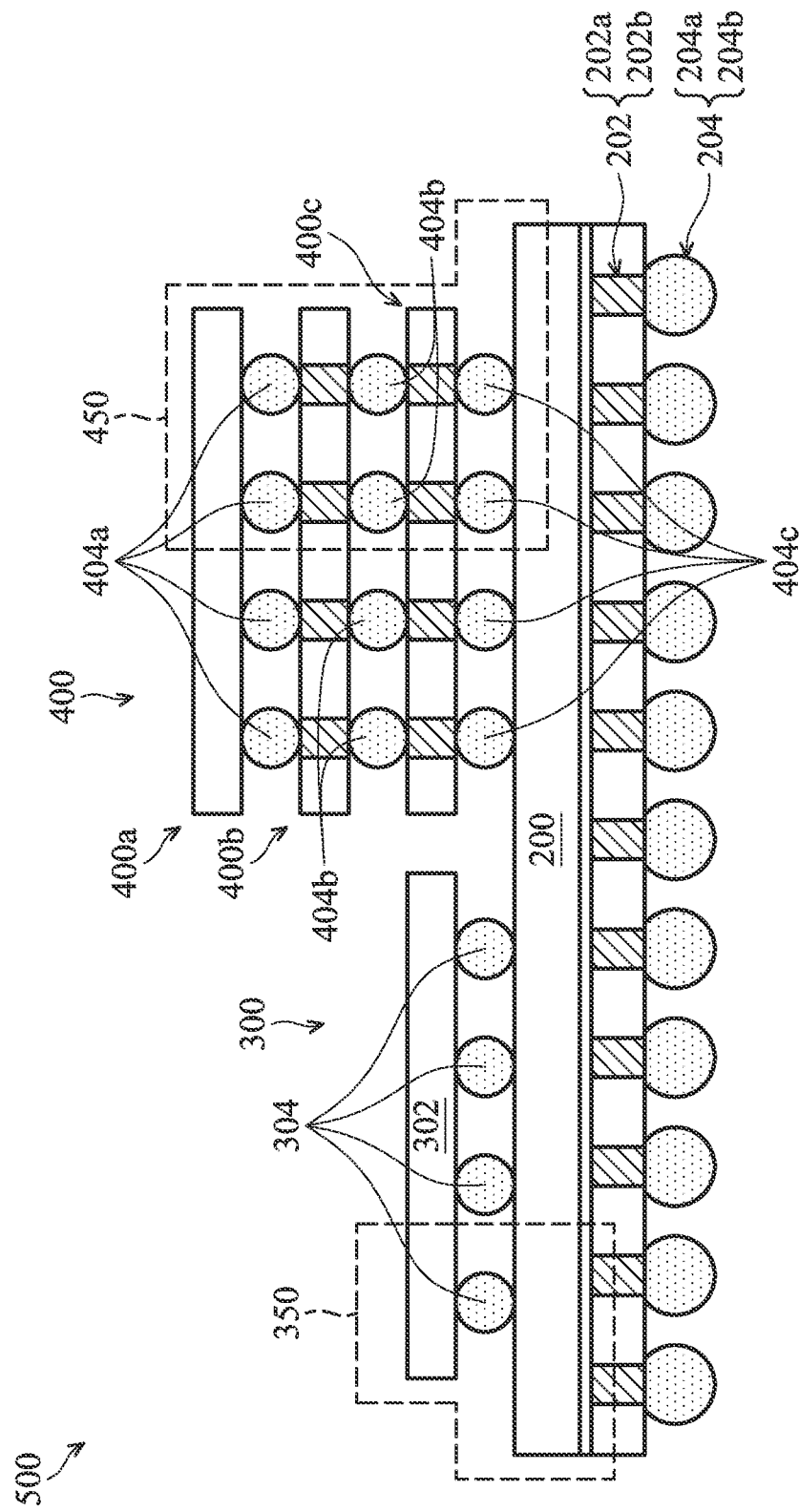
FIG. 1 is a cross-sectional view of a stacked integrated circuit in accordance with some embodiments of the disclosure.

The following description is of the best-contemplated mode of carrying out the invention. This description is made for the purpose of illustrating the general principles of the invention and should not be taken in a limiting sense. The scope of the invention is determined by reference to the appended claims.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

Embodiments provide a modularized stacked physical design framework for a stacked integrated circuit. The stacked integrated circuit may comprise a 2.5-dimensional (2.5D) and/or three-dimensional (3D) integrated circuit including at least one die mounted on an interposer. A module design can cut off to include a part of the interposer and corresponding through silicon vias (TSVs) to form a 2.5-dimensional (2.5D)/three-dimensional (3D) layout module to do independent implementation according to a designed function.

FIG. 1 is a cross-sectional view of a stacked integrated circuit 500 in accordance with some embodiments of the disclosure. The stacked integrated circuit 500 comprises an interposer 200 and a first die 300. In some embodiments, the first die 300 comprises a single die, such as a system on chip (SoC) die. The interposer 200 is provided for the first die 300 to be disposed thereon using a flip-chip technology or through silicon via (TSV) technology. The stacked integrated circuit 500 further comprises a second die 400 disposed on the interposer 200 and beside to the interposer 200. In some embodiments, the second die 400 comprises a memory die, for example, a SRAM die. The second die 400 may comprise a three-dimensional (3D) integrated circuit die. The second die 400 may comprise vertically stacked dies, for example, stacked dies 400a, 400b and 400c. The die 400a is vertically stacked on the die 400b, and the die 400b is vertically stacked on the die 400c. The dies 400a, 400b and 400c may be individually disposed using a flip-chip technology or through silicon via (TSV) technology.

Figure 2A:
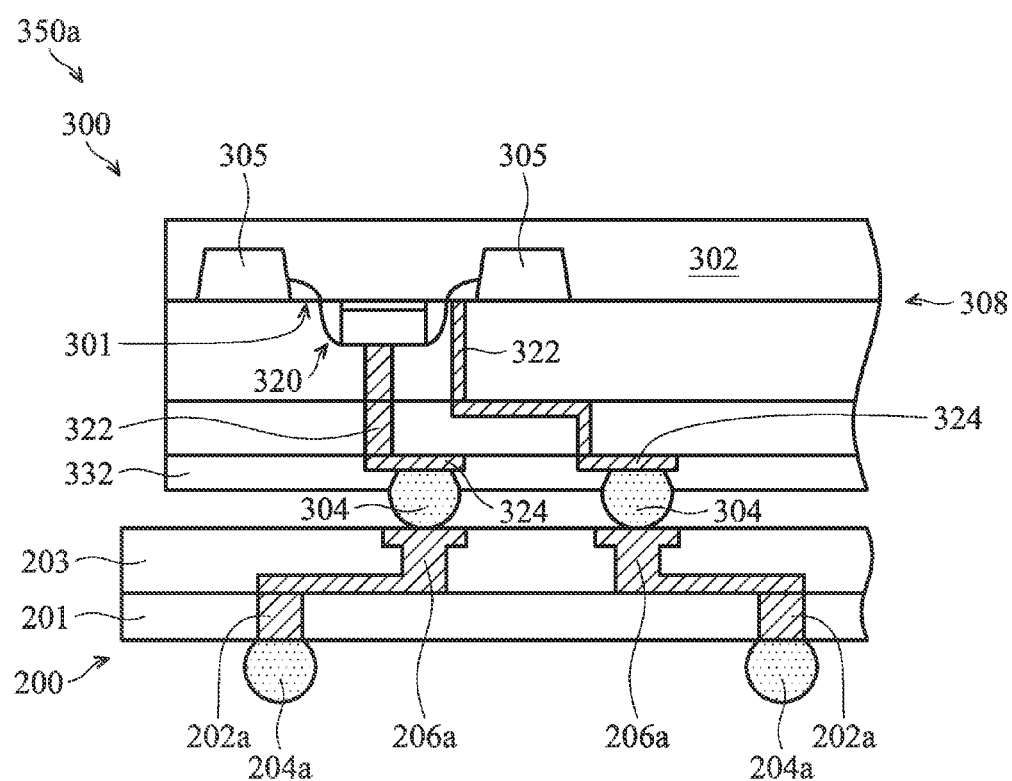
FIGS. 2A and 2B are enlarged views of FIG. 1, showing a 2.5D stacked integrated circuit module with a first function in accordance with some embodiments of the disclosure.
Figure 2B:
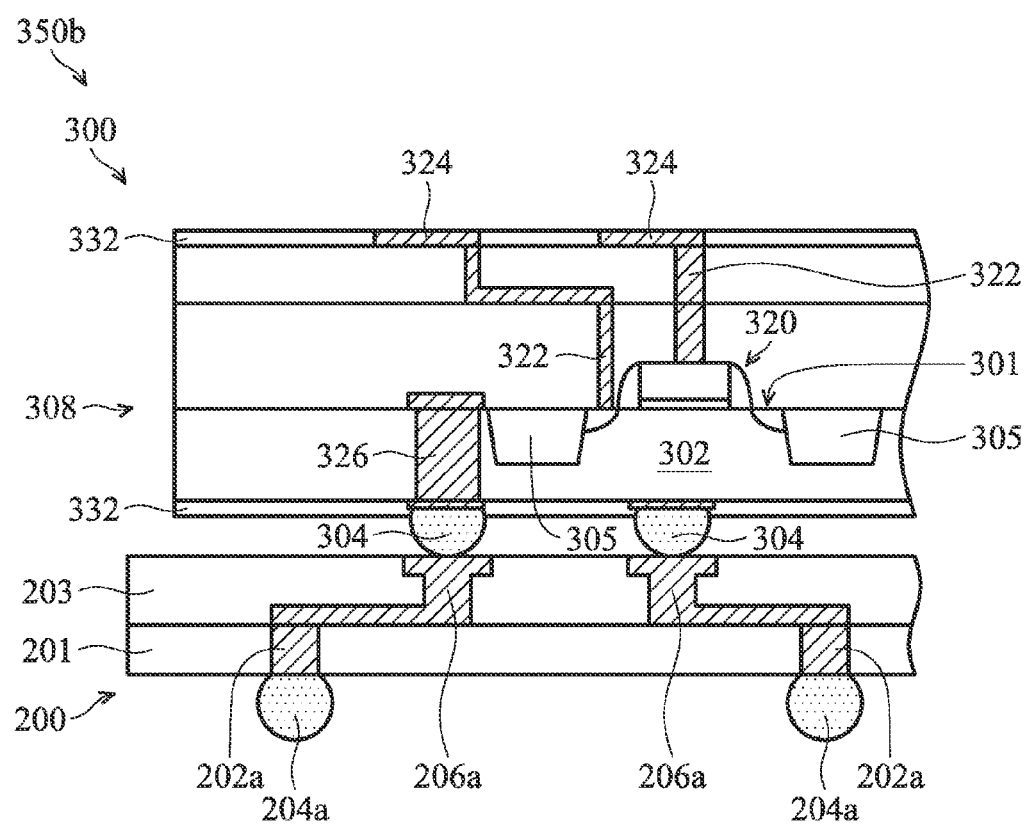
Figure 2C:
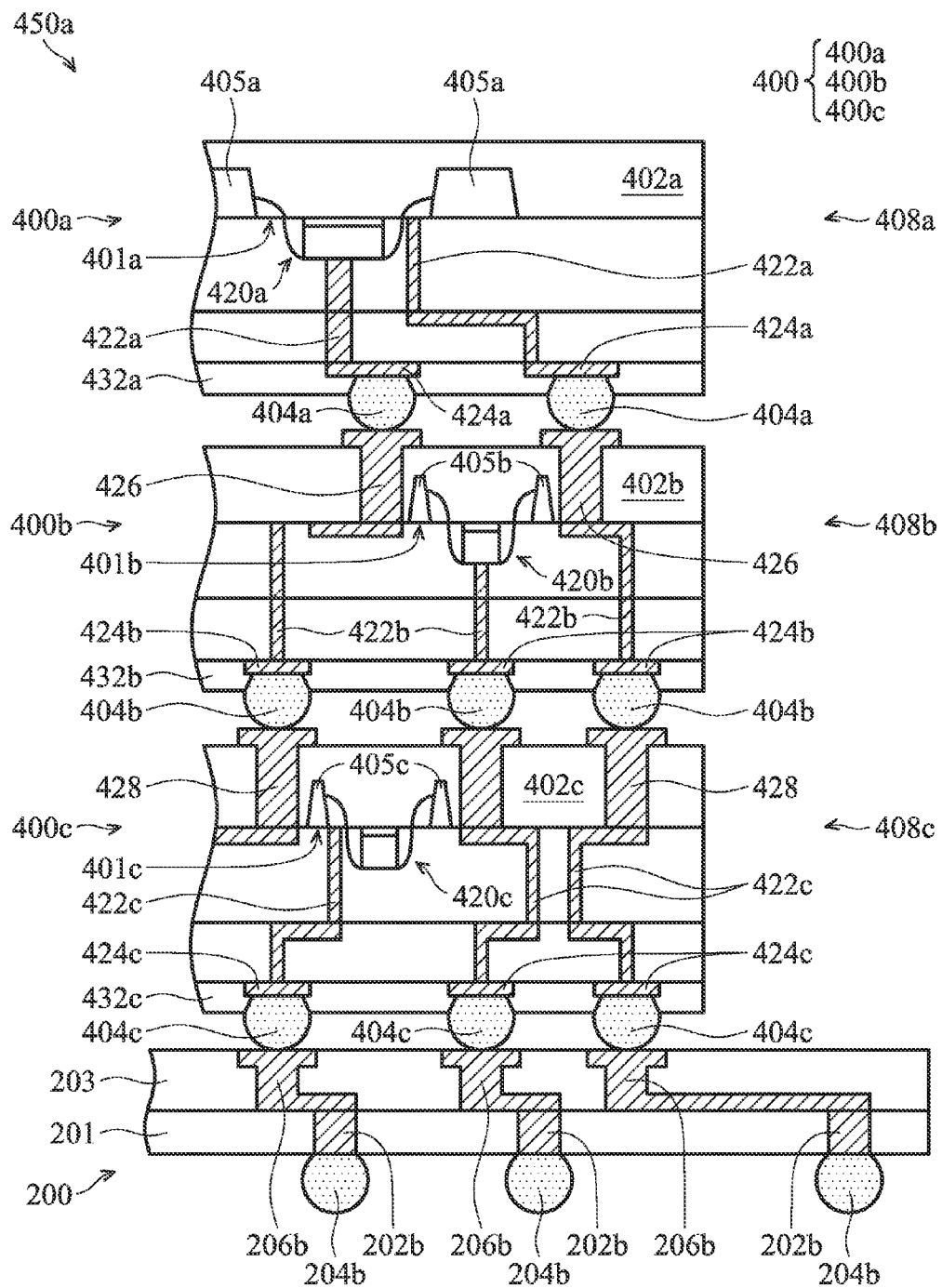
FIGS. 2C and 2D are enlarge view of FIG. 1, showing a 3D stacked integrated circuit module with a second function in accordance with some embodiments of the disclosure.
Figure 2D:
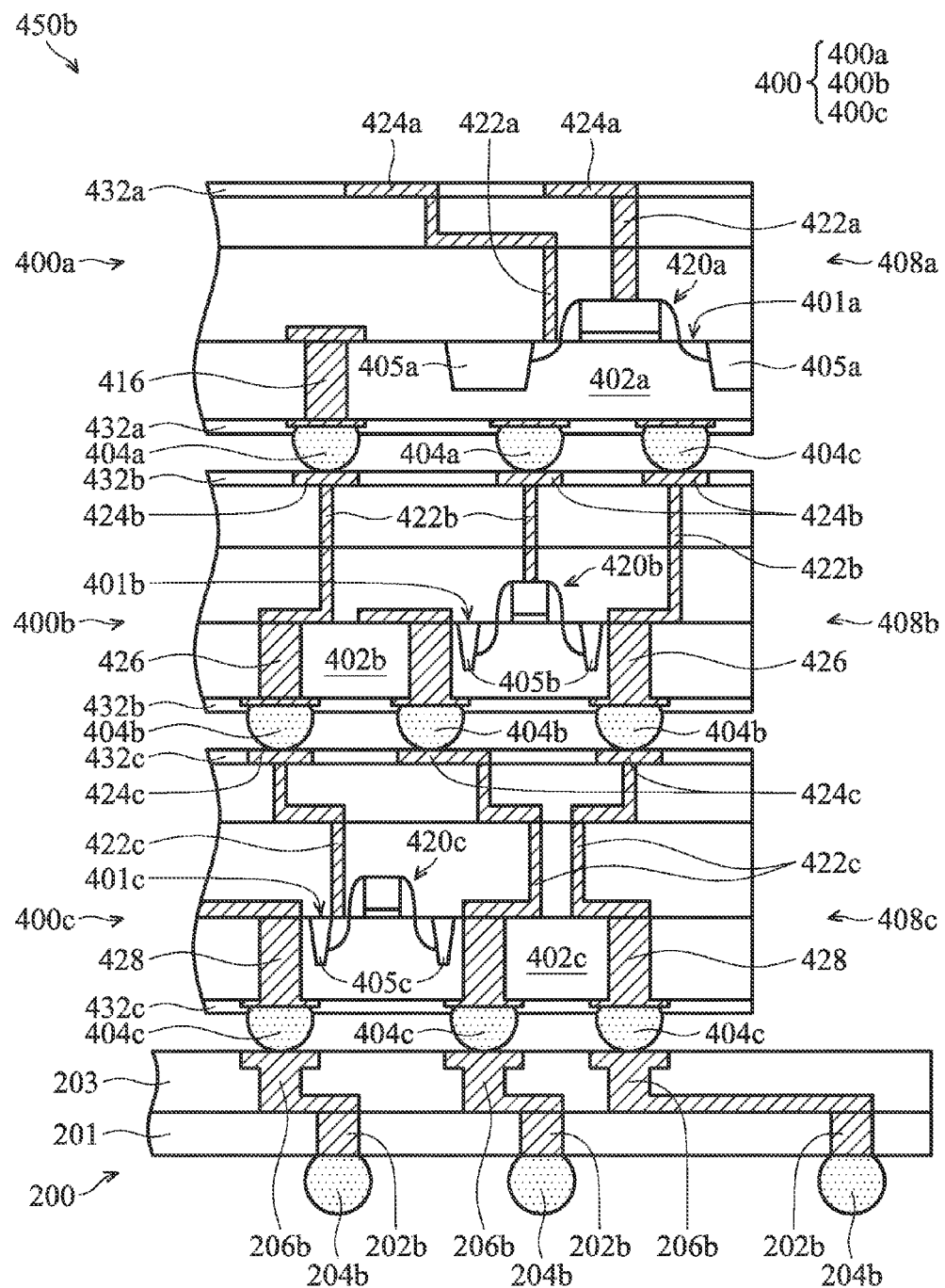

As shown in FIG. 1, the stacked integrated circuit 500 may comprise a 2.5D stacked integrated circuit module 350 (comprising a 2.5D stacked integrated circuit module 350a as shown in FIG. 2A and a 2.5D stacked integrated circuit module 350b as shown in FIG. 2B) and a 3D stacked integrated circuit module 450 (comprising a 3D stacked integrated circuit module 450a as shown in FIG. 2C and a 3D stacked integrated circuit module 350b as shown in FIG. 2D) with different functions. In some embodiments, the 2.5D stacked integrated circuit module 350 may be composed of a portion of the first die 300 and a corresponding portion of the interposer 200 having a first function, for example, a digital function, an analog function, a mixed-signal function or a radio-frequency (RF) function. The 3D stacked integrated circuit module 450 may be composed of a portion of the first die 300 and a corresponding portion of the interposer 200 having a second function that is different from the first function. The second function may comprise a memory function.

FIG. 2A is an enlarge view of FIG. 1, showing the 2.5D stacked integrated circuit module 350a with the first function in accordance with some embodiments of the disclosure. As shown in FIG. 2A, the 2.5D stacked integrated circuit module 350 may comprise a portion of the first die 300 and a corresponding portion of the interposer 200 having the same function. In this embodiment, the first die 300 is disposed on the interposer 200 using the flip-chip technology. The first die 300 is coupled to the corresponding portion of the interposer 200 through conductive bumps 304 on redistribution patterns 324. The first die 300 comprises a semiconductor substrate 302. At least one integrated circuit device 320 is formed on an active region 301 of the semiconductor substrate 300. The integrated circuit device 320 may comprise active devices and passive devices, for example, transistors, diodes, bipolar junction diodes (BJTs), resistors, capacitors, inductors or a combination thereof. As shown in FIG. 2A, the integrated circuit device 320 may be isolated from the other devices (not shown) by isolation features (for example, shallow trench isolation (STI) features) 305 formed in the semiconductor substrate 200. Also, the active region 301 is defined by the isolation features 305. Interconnect structures 322 may be formed on the semiconductor substrate 200, in a dielectric layer laminating structure 308. In some embodiments, the interconnect structures 322 are electrically connected the integrated circuit device 320. In some embodiments, the interconnect structures 322 may be constructed by contacts, vias and metal layer patterns, and the metal layer patterns are disposed vertically between the contacts and via and/or vias in different layer levels. The number of metal layer patterns is defined by the design of the integrated circuit device 320, and the scope of the invention is not limited thereto. The redistribution patterns 324 are formed on the dielectric layer laminating structure 308, connecting terminals of the interconnect structures 322, which is away from the semiconductor substrate 302. Also, a solder mask layer 332 is formed covering the dielectric layer laminating structure 308. The conductive bumps 304 are formed through the solder mask layer 332 to connect to the redistribution patterns 324.

As shown in FIG. 2A, the corresponding portion of the interposer 200 of the 2.5D stacked integrated circuit module 350 may comprise a resin-based core substrate 201 formed by laminated bismaleimide triazine (BT). Interconnect structures 206a may be formed on a surface the resin-based core substrate 201 close to the first die 300. The interconnect structures 206a may be formed in a dielectric layer laminating structure 203. A plurality of through silicon vias (TSVs) 202a are formed vertically to pass through the resin-based core substrate 201. Conductive bumps 204a are formed on another surface of the resin-based core substrate 201 away from to the first die 300. Each of the TSVs 202a may have two terminals respectively connected to the corresponding interconnect structure 206a and the corresponding conductive bumps 204a. In some embodiments, each of the interconnect structures 206a may have two terminals respectively connect the corresponding conductive bump 304a of the first die 300 and the corresponding TSV 202a.

FIG. 2B is an enlarge view of FIG. 1, showing the 2.5D stacked integrated circuit module 350b with the first function in accordance with some embodiments of the disclosure. Elements of the embodiments hereinafter, that are similar to those previously described with reference to FIGS. 1 and 2A, are not repeated for brevity. One of the differences between the 2.5D stacked integrated circuit modules 350a and 350b is that the first die 300 of the 2.5D stacked integrated circuit module 350b is disposed on the interposer 200 using the TSV technology. In this embodiment, the first die 300 is coupled to the corresponding portion of the interposer 200 through a through silicon via (TSV) 326 and the corresponding conductive bumps 304. The TSV 326 is formed passing through the semiconductor substrate 302.

FIG. 2C is an enlarge view of FIG. 1, showing the 3D stacked integrated circuit module 450a with a second function, in accordance with some embodiments of the disclosure. Elements of the embodiments hereinafter, that are similar to those previously described with reference to FIGS. 1, 2A and 2B, are not repeated for brevity. As shown in FIG. 2C, the 3D stacked integrated circuit module 450a may comprise a portion of the second die 400 and another corresponding portion of the interposer 200 having the same function. The second die 400 is coupled to the corresponding portion of the interposer 200 through conductive bumps 404c. The second die 400 is a 3D integrated circuit, for example, a memory die. The second die 400 may comprises dies 400a, 400b and 400c. The die 400a is vertically stacked on the die 400b, and the die 400b is vertically stacked on the die 400c using the flip-chip technology and the TSV technology. Similarly, the die 400a/400b/400c comprises a semiconductor substrate 402a/402b/402c including an active region 401a/401b/401c defined by the isolation features 405a/405b/405c. At least one of the integrated circuit devices 420a/420b/420c is formed on the semiconductor substrate 402a/402b/402c, in a dielectric layer laminating structure 408a/408b/408c. Redistribution patterns 424a/424b/424c are formed on the dielectric layer laminating structure 408a/408b/408c, connecting terminals of the interconnect structures 422a/422b/422c, which is away from the semiconductor substrate 402a/402b/402c. A solder mask layer 432a/432b/432c is formed covering the dielectric layer laminating structure 408a/408b/408c. Conductive bumps 404a/404b/404c are formed through the solder mask layer 432a/432b/432c to connect to the redistribution patterns 424a/424b/424c. Through silicon vias (TSVs) 426/248 are formed passing through the semiconductor substrate 402b/402c of the die 400b/400c.

In this embodiment, the die 400a is coupled to the die 400b through the conductive bumps 404a on the redistribution patterns 424a of the die 400a and the corresponding TSVs 426. The die 400b is coupled to the die 400c through the conductive bumps 404b on the redistribution patterns 424b of the die 400b and the corresponding TSVs 428. The die 400c is coupled to the corresponding portion of the interposer 200 of the 3D stacked integrated circuit module 450a through conductive bumps 404c on redistribution patterns 424c.

As shown in FIG. 2C, the corresponding portion of the interposer 200 of the 3D stacked integrated circuit module 450a may comprise interconnect structures 206b formed on a surface the resin-based core substrate 201 close to the second die 400. The interconnect structures 206b may be formed in a dielectric layer laminating structure 203. Through silicon vias (TSVs) 202b are formed vertically pass through the resin-based core substrate 201. Conductive bumps 204b are formed on another surface of the resin-based core substrate 201 away from to the first die 300. Each of the TSV 202b may have two terminals respectively connect the corresponding interconnect structure 206b and the corresponding conductive bump 204b. In some embodiments, each of the interconnect structures 206b may have two terminals respectively connecting the corresponding conductive bump 304b of the die 400c of the second die 400 and the corresponding TSV 202b. It should be noted that the first die 300, the second die 400 and the interposer 200 are exemplary only and not intended to be limiting in any manner, additional elements/layers may be present and/or omitted.

FIG. 2D is an enlarge view of FIG. 1, showing the 3D stacked integrated circuit module 450b with the first function in accordance with some embodiments of the disclosure. Elements of the embodiments hereinafter, that are similar to those previously described with reference to FIGS. 1 and 2A-2C, are not repeated for brevity. One of the differences between the 3D stacked integrated circuit modules 450a and 450b is that the dies 400a-400c of the 3D stacked integrated circuit module 450b are disposed on the interposer 200 using the TSV technology. In this embodiment, the die 400a is coupled to the die 400b through a TSV 416 and the conductive bumps 404a of the die 400a and the corresponding redistribution patterns 424b of the die 400b.

The die 400b is coupled to the die 400c through the TSVs 426 and the corresponding conductive bumps 404b of the die 400b and the corresponding redistribution patterns 424c of the die 400c. Also, the die 400c is coupled to the corresponding portion of the interposer 200 of the 3D stacked integrated circuit module 450b die 400c is coupled to the corresponding portion of the interposer 200 of the 3D stacked integrated circuit module 450 through the TSVs 428 of the die 400c. The TSV 416 is formed passing through the semiconductor substrate 402a. Solder mask layers 432a/432b/432c are formed covering the dielectric layer laminating structure 408a/408b/408c and bottom surfaces of the semiconductor substrate 402a/402b/402c.

In some embodiments, the first die 300 and the second die 400 may each be represented by several netlists. The netlists can be converted into corresponding physical layouts (also called "layouts") using tools (such as CAD tools). The layouts may include definitions and placements of device features (e.g., transistors including gates, doped regions), isolation features, interconnect structures (including metal layer patterns, vias and contacts), redistribution patterns, solder mask layers, conductive bumps, and/or other physical elements that will be formed on a semiconductor substrate of the first die 300 and the second die 400 as shown in FIGS. 1, 2A and 2B. The layouts of the first die 300 and the second die 400 may include a plurality of "layers" corresponding to each of a plurality of "physical layers" to be fabricated on a semiconductor substrate to form integrated circuits. A typical format for the layout is a GDS II file, however other formats are possible.

Similarly, the interposer 200 may be represented by several netlists. The layouts converted by the netlists may include definitions and placements of the interconnect structures the, TSVs and the conductive bumps of the interposer 200 as shown in FIGS. 1, 2A and 2B.

Figure 3:
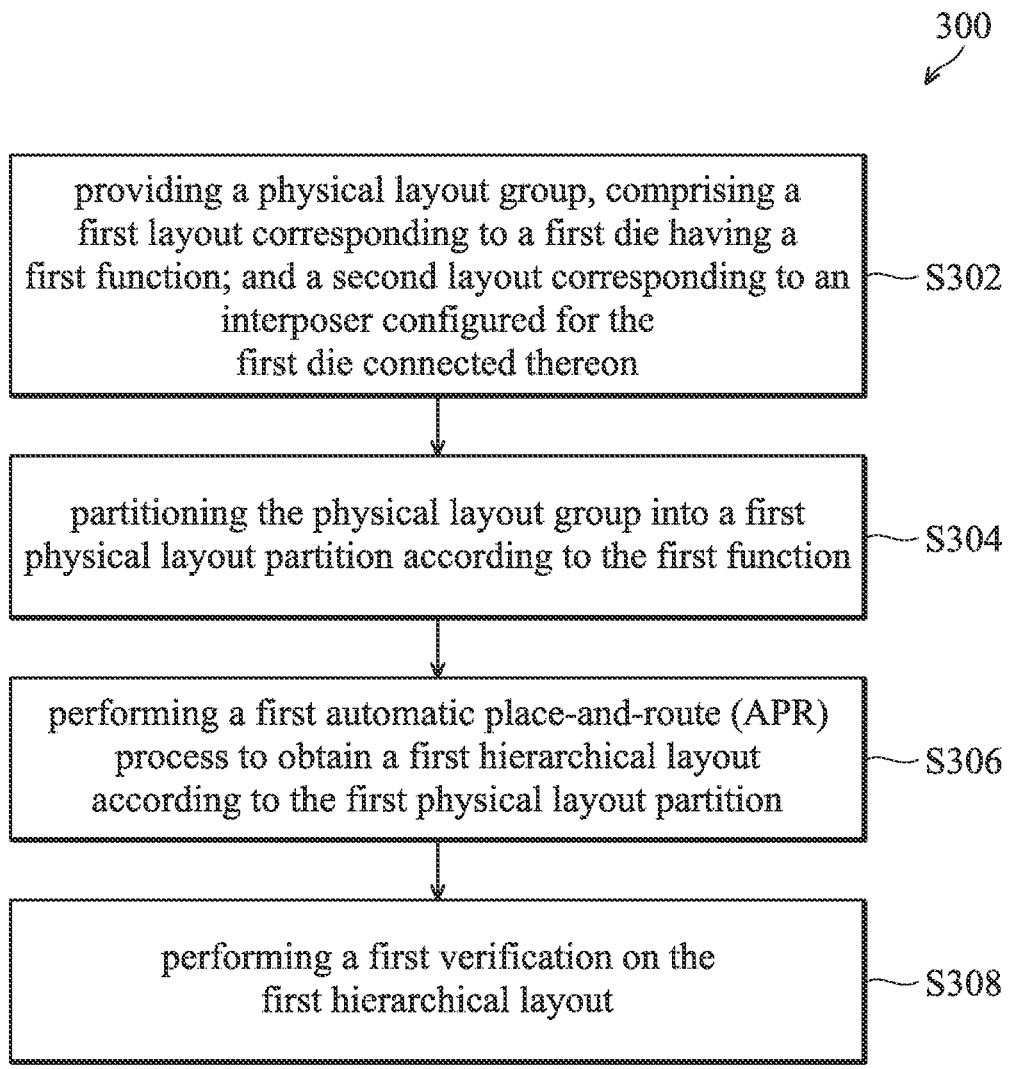
FIGS. 3-5 are flowcharts illustrating a method of designing an integrated circuit in accordance with some embodiments of the disclosure.
Figure 4:
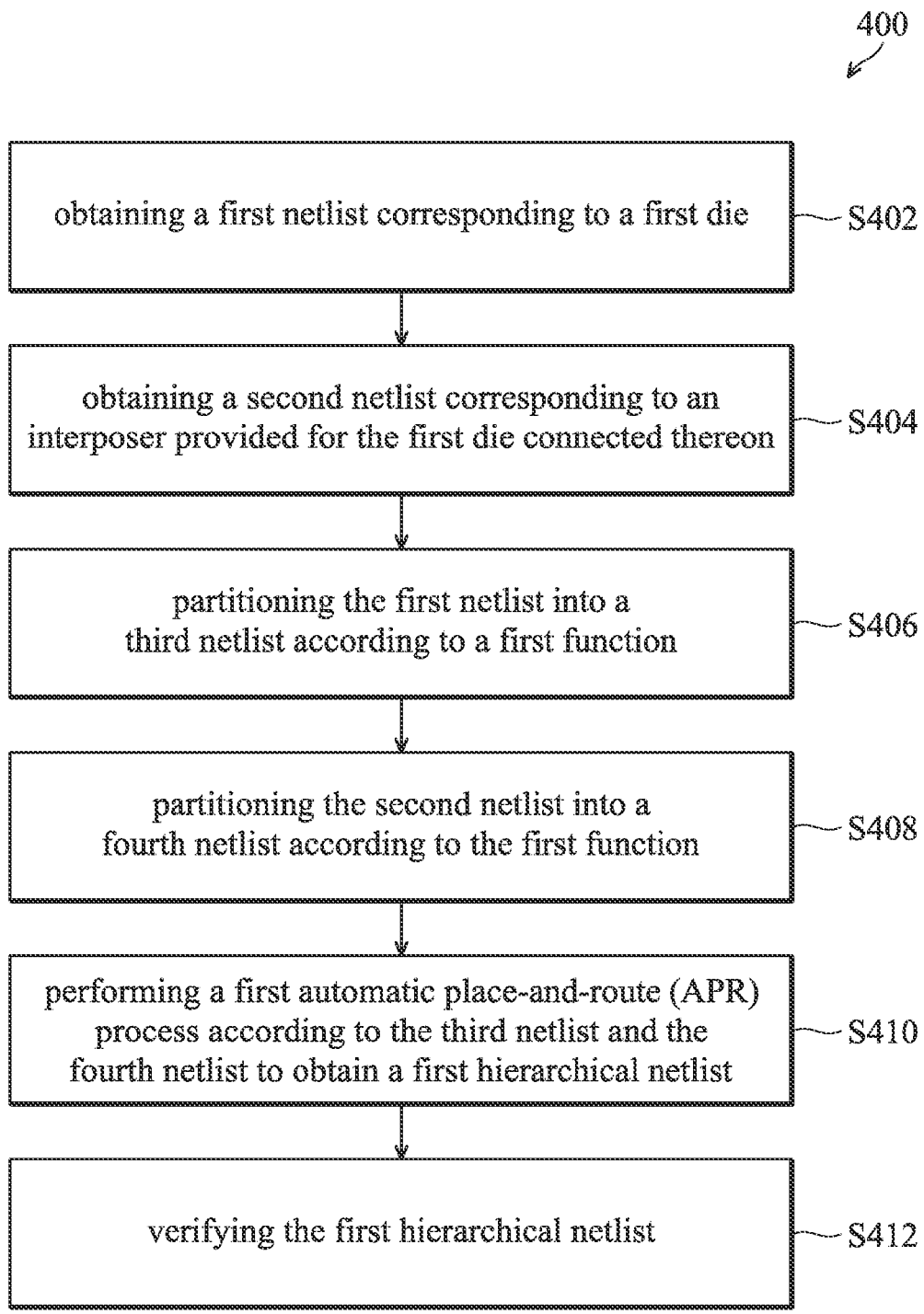
Figure 5:
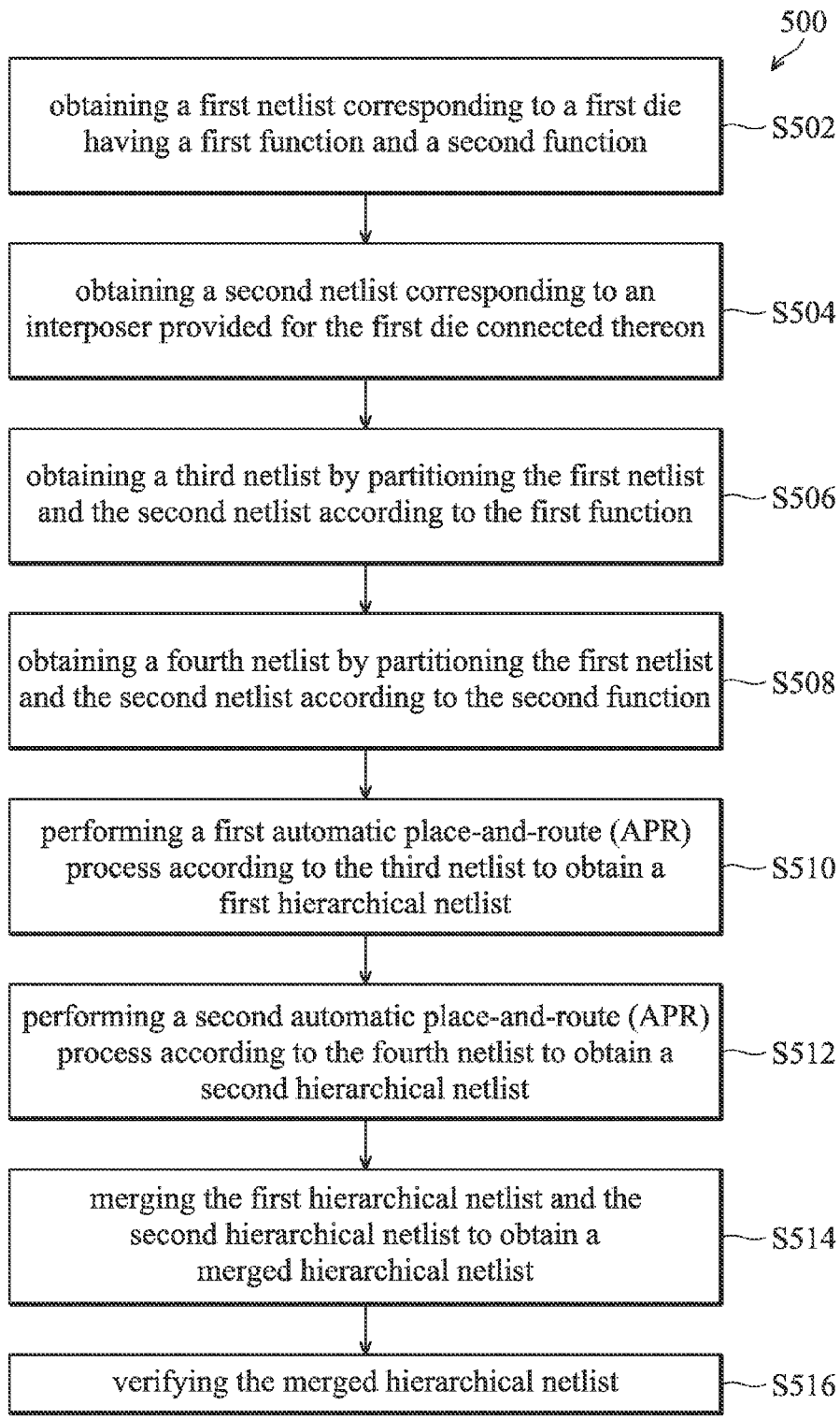
Figure 6:
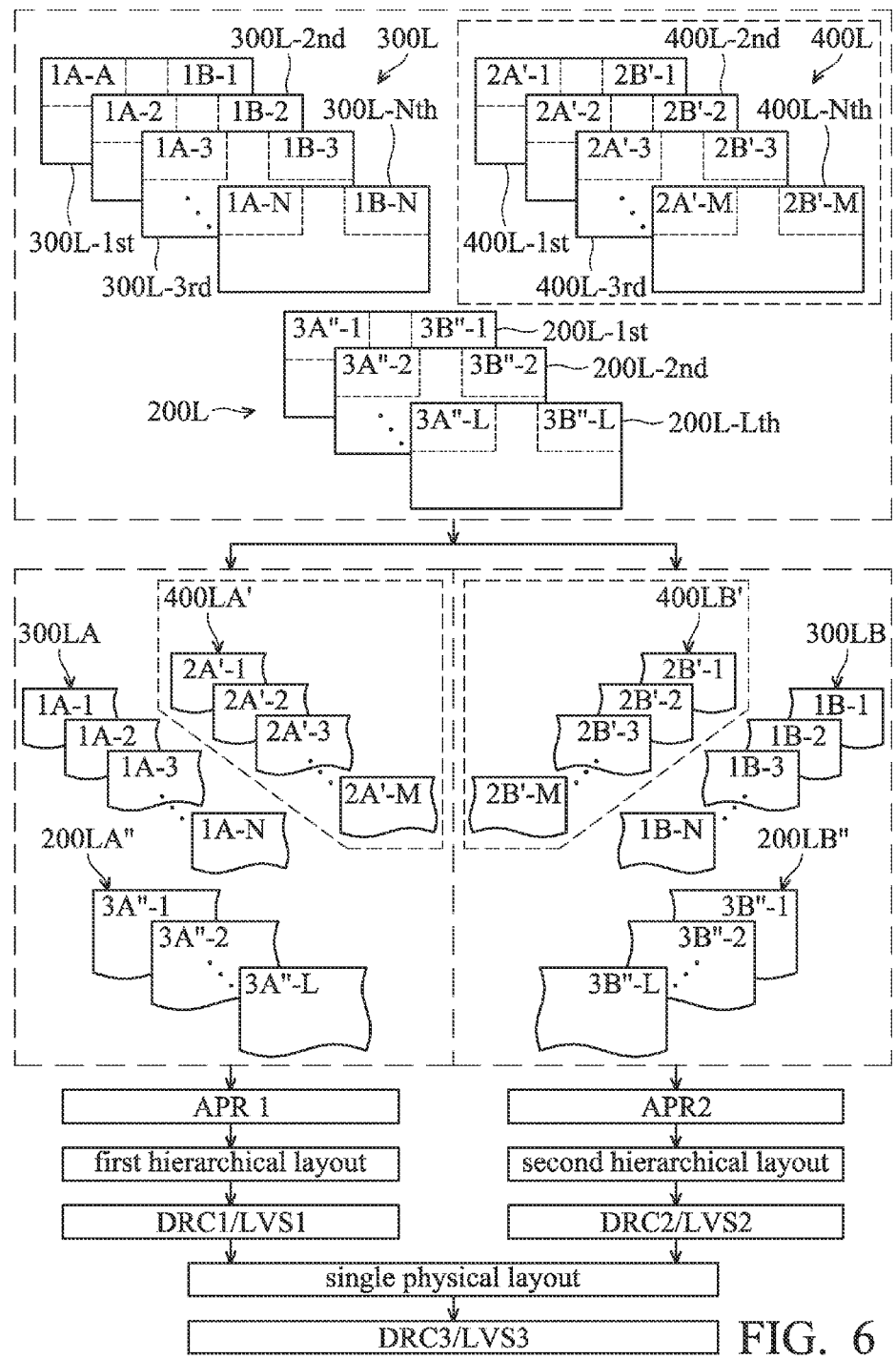
FIG. 6 is a diagram illustrating the methods of designing an integrated circuit in accordance with some embodiments of FIGS. 3-5.

FIGS. 3-5 are flowcharts illustrating methods 300, 400 and 500 of designing an integrated circuit in accordance with some embodiments of the disclosure. The methods 300, 400 and 500 are implemented and performed using a computer and illustrated as a physical layout on a display. FIG. 6 is a diagram illustrating the methods 300, 400 and 500 of designing an integrated circuit in accordance with some embodiments of FIGS. 3-5. FIG. 6 is performed using a computer and illustrated as a physical layout on a display. In some embodiments, the integrated circuit includes a stacked integrated circuit 500, for example, a 2.5D/3D integrated circuit as shown in FIG. 1.

As shown in FIG. 3, the method 300 begins at step S302 where a physical layout group is provided. As shown in FIG. 6, the physical layout group may comprise a first layout sub-group 300L and a third layout sub-group 200L. The first layout sub-group 300L corresponds to layouts of the first die 300, and the third layout sub-group 200L corresponds to layouts of the interposer 200 as shown in FIG. 1. In some embodiments, the first layout sub-group 300L may comprise several layouts, for example, layout 300L-$1^{st}$, layout 300L-$2^{nd}$, layout 300L-$3^{rd}$, . . . to layout 300L-$N^{th}$, where N is an any positive number. The third layout sub-group 200L may comprise several layouts, for example, layout 200L-$1^{st}$, layout 200L-$2^{nd}$, layout 200L-$3^{rd}$, . . . to layout 200L-$L^{th}$, where L is an any positive number. As mentioned before, the layouts 300L-$1^{st}$ to 300L-$N^{th}$ include definitions and placements of device features (e.g., transistors including gates, doped regions), isolation features, interconnect structures (including metal layer patterns, vias and contacts), redistribution patterns, solder mask layers, conductive bumps, and/or other physical elements that correspond to the first die 300 as shown in FIG. 1. Also, the layouts 200L-1$^{st}$ to 200L-L$^{th}$ include the definitions and placements of the interconnect structures, the TSVs and the conductive bumps of the interposer 200, which is configured to provide the first die 300 mounted thereon, as shown in FIG. 1. It should be noted that the first layout sub-group 300L corresponding to layouts of the first die 300 and the third layout sub-group 200L corresponding to layouts of the interposer 200 are planned in the same phase.

In some other embodiments as shown in FIG. 6, the physical layout group may further comprise a second layout sub-group 400L. The second layout sub-group 400L corresponds the layouts of to the second die 400 as shown in FIG. 1. The second layout sub-group 400L may comprise several layouts, for example, layout 400L-1$^{st}$, layout 400L-2$^{nd}$, layout 400L-3$^{rd}$, . . . to layout 400L-M$^{th}$, where M is an any positive number. The layouts 400L-1$^{st}$ to 400L-M$^{th}$ include definitions and placements of device features (e.g., transistors including gates, doped regions), isolation features, interconnect structures (including metal layer patterns, vias and contacts), redistribution patterns, solder mask layers, conductive bumps, and/or other physical elements corresponding to the second die 400 as shown in FIG. 1. Also, the layouts 200L-1$^{st}$ to 200L-L$^{th}$ include definitions and placements of the interconnect structures, the TSVs and the conductive bumps of the interposer 200, which is configured to provide the second die 400 mounted thereon, as shown in FIG. 1. It should be noted that the first layout sub-group 300L corresponding to layouts of the first die 300, the second layout sub-group 400L corresponding layouts of to the second die 400, and the third layout sub-group 200L corresponding to layouts of the interposer 200 are co-planed.

As shown in FIG. 6, in some embodiments, the first layout sub-group 300L may comprise layouts of a SoC die. The first layout sub-group 300L has several functions designed in each of the layouts 300L-1$^{st}$ to 300L-N$^{th}$. For example, the first layout sub-group 300L has at least a function A and a function B. Function A and function B are respectively designed in each of the layouts 300L-1$^{st}$ to 300L-N$^{th}$. For example, the layouts 300L-1$^{st}$ to 300L-N$^{th}$ of the first layout sub-group 300L are respectively designed to include regions 1A-1 to 1A-N corresponding to function A, and regions 1B-1 to 1B-N corresponding to function B. Also, the third layout sub-group 200L corresponding to layouts of the interposer 200 has several functions corresponding to the first layout sub-group 300L. The functions are designed in each of the layouts 200L-1$^{st}$ to 200L-L$^{th}$. For example, the layouts 200L-1$^{st}$ to 200L-L$^{th}$ of the third layout sub-group 200L are respectively designed to include regions 3A"-1 to 3A"-L corresponding to function A, and regions 3B"-1 to 3B"-L corresponding to function B.

In some other embodiments as shown in FIG. 6, the second layout sub-group 400L may comprise layouts of a memory die. The second layout sub-group 400L has several functions designed in each of the layouts of the second layout sub-group 400L. For example, the layouts 400L-1$^{st}$ to 400L-M$^{th}$ of the second layout sub-group 400L are respectively designed to include regions 2A'-1 to 2A'-M corresponding to function A', and regions 2B'-1 to 2B'-M corresponding to function B'. In some embodiments, the functions A' and B' of the second layout sub-group 400L may be a sub-function of the functions A and B of the first layout sub-group 300L, respectively. In some other embodiments, the functions A' and B' of the second layout sub-group 400L may respectively be the same as of the functions A and B of the first layout sub-group 300L. Therefore, the regions 2A'-1 to 2A'-M and 2B'-1 to 2B'-M of the layouts 400L-1$^{st}$ to 400L-M$^{th}$ of the second layout sub-group 400L can corresponds to the regions 1A-1 to 1A-N and 1B-1 to 1B-N of the layouts 300L-1$^{st}$ to 300L-N$^{th}$ of the first layout sub-group 300L, respectively. Also, the third layout sub-group 200L corresponding to layouts of the interposer 200 has several functions corresponding to the second layout sub-group 400L. The functions are designed in each of the layouts 200L-1$^{st}$ to 200L-L$^{th}$. For example, the layouts 200L-1$^{st}$ to 200L-L$^{th}$ of the third layout sub-group 200L are respectively designed to include regions 3A"-1 to 3A"-L corresponding to function A', and regions 3B"-1 to 3B"-L corresponding to function B'.

As shown in FIG. 3, the method 300 then proceeds to step S304 where the physical layout group is partitioned into a first physical layout partition according to the first function (e.g. function A). As shown in FIG. 6, in some embodiments, the first layout sub-group 300L of the physical layout group corresponding to layouts of the first die 300 and the third layout sub-group 200L of the physical layout group corresponding to layouts of the interposer 200 are partitioned into a first physical layout partition according to the first function, for example, function A. The first physical layout partition may comprise a first layout sub-group partition 300LA and a third layout sub-group partition 200LA". The first layout sub-group partition 300LA includes the regions 1A-1 to 1A-N corresponding to function A. The third layout sub-group partition 200LA" includes regions 3A"-1 to 3A"-L corresponding to function A. Also, the third layout sub-group partition 200LA" corresponds to the first layout sub-group partition 300LA.

In some other embodiments while the physical layout group may further comprises a second layout sub-group 400L as shown in FIG. 6, the second layout sub-group 400L of the physical layout group corresponding to layouts of the second die 400 is also partitioned into the first physical layout partition according to the first function, for example, function A' corresponding to function A of the first layout sub-group 300L. Therefore, the first physical layout partition may further comprise a second layout sub-group partition 400LA'. The second layout sub-group partition 400LA' includes the regions 2A'-1 to 2A'-M corresponding to function A'. Also, the third layout sub-group partition 200LA" corresponds to the second layout sub-group partition 400LA'. For example, third layout sub-group partition 200LA" including regions 3A"-1 to 3A"-L also corresponds to function A'.

In some other embodiments, the method 300 further comprises partitioning the physical layout group into a second physical layout partition according to the second function after performing step S302. As shown in FIG. 6, in some embodiments, the first layout sub-group 300L of the physical layout group corresponding to layouts of the first die 300 and the third layout sub-group 200L of the physical layout group corresponding to layouts of the interposer 200 are partitioned into a second physical layout partition according to the second function, for example, function B. The second physical layout partition may comprise a first layout sub-group partition 300LB and a third layout sub-group partition 200LB". The first layout sub-group partition 300LB includes the regions 1B-1 to 1B-N corresponding to function B. The third layout sub-group partition 200LB" includes the 3B"-1 to 3A"-B corresponding to function B. Also, the third layout sub-group partition 200LB" corresponds to the first layout sub-group partition 300LB. For example, third layout sub-group partition 200LB" including regions 3B"-1 to 3B"-L, also corresponding to function B'.

In some other embodiments while the physical layout group may further comprises a second layout sub-group 400L as shown in FIG. 6, the second layout sub-group 400L corresponding to layouts of the second die 400 is also partitioned into the second physical layout partition according to the second function, for example, function B' corresponding to function B of the first layout sub-group 300L. Therefore, the second physical layout partition may further comprise a second layout sub-group partition 400LB'. The second layout sub-group partition 400LB' includes the regions 2B'-1 to 2B'-M corresponding to function B'. Also, the third layout sub-group partition 200LB" corresponds to the second layout sub-group partition 400LB'.

As shown in FIG. 3, the method 300 then proceeds to step S306 where a first automatic place-and-route (APR) process is performed to obtain a first hierarchical layout according to the first physical layout partition. As shown in FIG. 6, for example, the first APR process APR1 is performed on the first physical layout partition comprising the first layout sub-group partition 300LA and the third layout sub-group partition 200LA" to obtain the first hierarchical layout corresponding to function A. In some other embodiments, the first APR process APR1 is performed on the first physical layout partition comprising the first layout sub-group partition 300LA, the second layout sub-group partition 400LA' and the third layout sub-group partition 200LA" to obtain the first hierarchical layout corresponding to function A.

As shown in FIG. 6, in some other embodiments, the method 300 further comprises performing a second automatic place-and-route (APR) process to obtain a second hierarchical layout according to the second physical layout partition after performing step S304. As shown in FIG. 6, for example, the second APR process APR2 is performed on second physical layout partition comprising the first layout sub-group partition 300LB and a third layout sub-group partition 200LB" to obtain the second hierarchical layout corresponding to function B. In some other embodiments, the second APR process APR2 is performed on the second physical layout partition comprising the first layout sub-group partition 300LB, the second layout sub-group partition 400LB' and the third layout sub-group partition 200LB" to obtain the second hierarchical layout corresponding to function B.

As shown in FIG. 3, afterwards, the method 300 proceeds to step S308 where a first verification is performed on the first hierarchical layout. In some embodiments, the first verification comprises a design rule check (DRC) and/or a layout-versus-schematic (LVS). The DRC verification may ensure that the layout follows specific design rules of a process (e.g., geometric constraints). The LVS verification includes determining that the manipulation of the design from a netlist form to the physical layout (e.g., a GDS II file) form was properly executed. As shown in FIG. 6, for example, a design rule check DRC1 and/or a layout-versus-schematic LVS1 are performed on the first hierarchical layout.

As shown in FIG. 6, in some other embodiments, the method 300 further comprises performing a second verification on the second hierarchical layout. In some embodiments, the second verification comprises at least one of a design rule check (DRC) or a layout-versus-schematic (LVS). As shown in FIG. 6, for example, a design rule check DRC2 and/or a layout-versus-schematic LVS2 are performed on the second hierarchical layout.

As shown in FIG. 6, in some other embodiments, the method 300 further comprises merging the first hierarchical layout and the second hierarchical layout to obtain a single physical layout after performing the first and second verifications on the first and second hierarchical layout, respectively. The single physical layout corresponds to the layouts of a stacked integrated circuit device comprising the first die 300, the second die 400 and the interposer 200 as shown in FIG. 1. The method 300 further comprises performing a third verification on the single physical layout after obtaining the single physical layout. In some embodiments, the third verification comprises at least one of a design rule check (DRC) or a layout-versus-schematic (LVS). As shown in FIG. 6, for example, a design rule check DRC3 and/or a layout-versus-schematic LVS3 are performed on the single physical layout.

FIG. 4 is a flowchart illustrating a method 400 of designing an integrated circuit in accordance with some embodiments of the disclosure. For example, the integrated circuit may comprise the stacked integrated circuit 500 as shown in FIG. 1. Also, FIG. 6 is a diagram illustrating the method of designing an integrated circuit in accordance with some embodiments of FIG. 4. Elements of the embodiments hereinafter that are the same or similar to those previously described with reference to FIGS. 1, 2A, 2B and 3, are not repeated for brevity.

As shown in FIG. 4, the method 400 begins at step S402 where a first netlist corresponding to a first die (e.g. the first die 300 as shown in FIG. 1) is obtained. As shown in FIG. 6, in some embodiments, the first netlist can be converted into the corresponding first layout sub-group 300L. The first layout sub-group 300L corresponds to the layouts of the first die 300 as shown in FIG. 1.

As shown in FIG. 4, the method 400 then proceeds to step S404 where a second netlist corresponding to an interposer provided for the first die connected thereon is obtained. As shown in FIG. 6, in some embodiments, the second netlist can be converted into the corresponding third layout sub-group 200L. The third layout sub-group 200L corresponds to the layouts of the interposer 200 as shown in FIG. 1.

As shown in FIG. 4, the method 400 Afterwards proceeds to step S406 where the first netlist is partitioned into a third netlist according to a first function. As shown in FIG. 6, in some embodiments, the first netlist is partitioned into a third netlist according to a first function, for example, function A. The third netlist may be converted into the corresponding first layout sub-group partition 300LA.

As shown in FIG. 4, the method 400 Afterwards proceeds to step S408 where the second netlist is partitioned into a fourth netlist according to the first function. As shown in FIG. 6, in some embodiments, the second netlist is partitioned into a fourth netlist according to the first function, for example, function A. The fourth netlist also corresponds to the third netlist. The fourth netlist be converted into the corresponding third layout sub-group partition 200LA", which corresponds to function A. Also, the third layout sub-group partition 200LA" corresponds to the first layout sub-group partition 300LA.

As shown in FIG. 4, afterwards, the method 400 proceeds to step S410 where a first automatic place-and-route (APR) process is performed according to the third netlist and the fourth netlist to obtain a first hierarchical netlist. As shown in FIG. 6, for example, the first APR process APR1 is performed on the first layout sub-group partition 300LA, which is converted from the third netlist, and the third layout sub-group partition 200LA", which is converted from the fourth netlist, to obtain the first hierarchical layout corresponding to function A.

As shown in FIG. 4, afterwards, the method 400 proceeds to step S412 where the first hierarchical layout is verified by using a first verification. In some embodiments, the first verification comprises at least one of a design rule check (DRC) or a layout-versus-schematic (LVS). The DRC verification may ensure that the layout follows specific design rules of a process (e.g., geometric constraints). The LVS verification includes determining that the manipulation of the design from a netlist form to the physical layout (e.g., a GDS II file) form was properly executed. As shown in FIG. 6, for example, a design rule check DRC1 and/or a layout-versus-schematic LVS1 are performed on the first hierarchical layout.

In some other embodiments, the first and second netlists may further comprise a second function (e.g. function B). In some other embodiments, the method 400 may further comprise partitioning the first netlist into a fifth netlist according to a second function different from the first function after performing step 406. As shown in FIG. 6, in some embodiments, the first netlist can be partitioned into a fifth netlist according to the second function, for example, function B. The fifth netlist be converted into the corresponding first layout sub-group partition 300LB.

In some other embodiments, the method 400 may further comprise partitioning the second netlist into a sixth netlist according to the second function after performing step 408. As shown in FIG. 6, in some embodiments, the second netlist can be partitioned into a sixth netlist according to the second function, for example, function B. The sixth netlist also corresponds to the fifth netlist. The sixth netlist be converted into the corresponding third layout sub-group partition 200LB". Also, the third layout sub-group partition 200LB" corresponds to the first layout sub-group partition 300LB. The third layout sub-group partition 200LB" and the first layout sub-group partition 300LB may collectively compose as the second physical layout partition corresponding to the integrated circuit module 450 as shown in FIG. 2B.

In some other embodiments, the method 400 may further comprise performing a second automatic place-and-route (APR) process according to the fifth netlist and the sixth netlist to obtain a second hierarchical netlist after performing step 410. As shown in FIG. 6, for example, the second APR process APR2 is performed on the first layout sub-group partition 300LB, which is converted from the fifth netlist, and the third layout sub-group partition 200LB", which is converted from the sixth netlist, to obtain the second hierarchical layout corresponding to function B.

Afterwards, the method 400 may proceed to verify the second hierarchical netlist. As shown in FIG. 6, in some other embodiments, the method 400 further comprises performing a second verification on the second hierarchical layout. In some embodiments, the second verification comprises at least one of a design rule check (DRC) or a layout-versus-schematic (LVS). As shown in FIG. 6, for example, a design rule check DRC2 and/or a layout-versus-schematic LVS2 are performed on the second hierarchical layout.

Afterwards, the method 400 may further proceed to merge the first hierarchical netlist and the second hierarchical netlist to obtain a first merged hierarchical netlist after performing the first and second verifications on the first and second hierarchical layout, respectively. As shown in FIG. 6, in some embodiments, the first merged hierarchical netlist may correspond to the single physical layout. The first merged hierarchical netlist may correspond to a stacked integrated circuit (e.g. the 2.5D stacked integrated circuit module 350) comprising the first die 300 and the interposer 200 as shown in FIG. 1.

Afterwards, the method 400 may further proceed to verify the first merged hierarchical netlist. As shown in FIG. 6, in some other embodiments, the method 400 further comprises performing a third verification on the single physical layout after obtaining the single physical layout. In some embodiments, the third verification comprises at least one of a design rule check (DRC) or a layout-versus-schematic (LVS). As shown in FIG. 6, for example, a design rule check DRC3 and/or a layout-versus-schematic LVS3 are performed on the single physical layout.

In some other embodiments, the integrated circuit may further comprise a second die mounted on the interposer. In some other embodiments, the method 400 may further comprise obtaining a seventh netlist corresponding to a second die, for example, the second die 400 as shown FIG. 1. As shown in FIG. 6, in some embodiments, the seventh netlist can be converted into the corresponding second layout sub-group 400L using tools (such as CAD tools). The second layout sub-group 400L corresponds to the layouts of the second die 400, for example, a memory die, as shown in FIG. 1.

Afterwards, the method 400 may further comprise partitioning the seventh netlist into an eighth netlist according to a second function (e.g. function B) different from the first function (e.g. function A) after obtaining the seventh netlist. As shown in FIG. 6, in some embodiments, the seventh netlist can be partitioned into an eighth netlist according to the second function, for example, function B. The eighth netlist also corresponds to the fifth netlist (e.g. the first layout sub-group partition 300LB). The eighth netlist may be converted into the corresponding second layout sub-group partition 400LB'. Also, the second layout sub-group partition 400LB' corresponds to the first layout sub-group partition 300LB.

Afterwards, the method 400 may further comprise partitioning the second netlist into a ninth netlist according to the second function (e.g. function B) after obtaining the eighth netlist. As shown in FIG. 6, in some embodiments, the ninth netlist may be the same as the sixth netlist corresponding to the second function, for example, function B. The ninth netlist also corresponds to the fifth netlist (e.g. the first layout sub-group partition 300LB). The ninth netlist be converted into the corresponding third layout sub-group partition 200LB". Also, the third layout sub-group partition 200LB" corresponds to the first layout sub-group partition 300LB. The third layout sub-group partition 200LB" and the first layout sub-group partition 300LB may collectively compose the second physical layout partition corresponding to the integrated circuit module 450 as shown in FIG. 2B.

Afterwards, the method 400 may further comprise performing a third automatic place-and-route (APR) process according to the eighth netlist and the ninth netlist to obtain a third hierarchical netlist after obtaining the ninth netlist. As shown in FIG. 6, in some embodiments, the third APR process may be the same as the second APR process APR2, and the third hierarchical netlist may be the same as the second hierarchical layout. In some other embodiments, the third APR process is performed on the second physical layout partition comprising the second layout sub-group partition 400LB' and the third layout sub-group partition 200LB" to obtain the second hierarchical layout corresponding to function B.

Afterwards, the method 400 may further comprise verifying the third hierarchical netlist after obtaining the third hierarchical netlist. As shown in FIG. 6, in some other embodiments, a verification comprising the design rule check DRC2 and/or the layout-versus-schematic LVS2 is performed on the third hierarchical netlist.

Afterwards, the method 400 may further comprise merging the first hierarchical netlist and the third hierarchical netlist to obtain a second merged hierarchical netlist after performing the first and third verifications on the first and third hierarchical layout, respectively. As shown in FIG. 6, in some embodiments, the second merged hierarchical netlist may correspond to the single physical layout. In some embodiments, the second merged hierarchical netlist corresponds to a stacked integrated circuit 500 comprising the first die 300, the second die 400 and the interposer 200 as shown in FIG. 1.

Afterwards, the method 400 may further proceed to verify the second merged hierarchical netlist after obtaining the second merged hierarchical netlist. As shown in FIG. 6, in some other embodiments, a verification comprising the design rule check DRC3 and/or a layout-versus-schematic LVS3 are performed on the second merged hierarchical netlist.

FIG. 5 is a flowchart illustrating a method 500 of designing an integrated circuit in accordance with some embodiments of the disclosure. For example, the integrated circuit may comprise the stacked integrated circuit 500 as shown in FIG. 1. Also, FIG. 6 is a diagram illustrating the method 500 of designing an integrated circuit in accordance with some embodiments of FIG. 5. Elements of the embodiments hereinafter, that are the same or similar to those previously described with reference to FIGS. 1, 2A, 2B, 3 and 4, are not repeated for brevity.

As shown in FIG. 5, the method 500 begins at step S502 where a first netlist corresponding to a first die having a first function (e.g. function A) and a second function (e.g. function B) is obtained. As shown in FIG. 6, in some embodiments, the first netlist can be converted into the corresponding first layout sub-group 300L using tools (such as CAD tools). The first layout sub-group 300L has function A and function B. The first layout sub-group 300L corresponds to the layouts of the first die 300 as shown in FIG. 1. The first die (e.g. the first die 300 as shown in FIG. 1) is a SoC die. Therefore, the first netlist comprises a placement design for bump structures of the SoC die. The bump structures connect the SoC die and the interposer (e.g. the interposer 200 as shown in FIG. 1).

Afterwards, as shown in FIG. 5, the method 500 proceeds to step S504 where a second netlist corresponding to an interposer provided for the first die (e.g. the first die 300 as shown in FIG. 1) connected thereon is obtained. As shown in FIG. 6, in some embodiments, the second netlist can be converted into the corresponding third layout sub-group 200L using tools (such as CAD tools). The third layout sub-group 200L corresponds to the layouts of the interposer 200 as shown in FIG. 1. The second netlist may correspond to a placement design for through hole vias (TSVs) passing through the interposer 200 as shown in FIG. 1.

Afterwards, as shown in FIG. 5, the method 500 proceeds to step S506 where a third netlist is obtained by partitioning the first netlist and the second netlist according to the first function (e.g. function A). As shown in FIG. 6, in some embodiments, the third netlist can be converted into the corresponding layout comprising the first layout sub-group partition 300LA and the third layout sub-group partition 200LA".

Afterwards, as shown in FIG. 5, the method 500 proceeds to step S508 where a fourth netlist is obtained by partitioning the first netlist and the second netlist according to the second function (e.g. function B). As shown in FIG. 6, in some embodiments, the fourth netlist can be converted into the corresponding layout comprising the first layout sub-group partition 300LB and the third layout sub-group partition 200LB".

Afterwards, as shown in FIG. 5, the method 500 proceeds to step S510 where a first automatic place-and-route (APR) process is performed according to the third netlist to obtain a first hierarchical netlist. As shown in FIG. 6, for example, the first APR process APR1 is performed on the first layout sub-group partition 300LA and the third layout sub-group partition 200LA", which is converted from the third netlist, to obtain the first hierarchical layout corresponding to function A.

In some other embodiments, the method 400 may then proceed to performing a first verification on the first hierarchical layout. In some embodiments, the first verification comprising the design rule check DRC1 and/or the layout-versus-schematic LVS1 are performed on the first hierarchical layout.

Afterwards, as shown in FIG. 5, the method 500 proceeds to step S512 where a second automatic place-and-route (APR) process is performed according to the fourth netlist to obtain a second hierarchical netlist. As shown in FIG. 6, for example, the second APR process APR2 is performed on the first layout sub-group partition 300LB and the third layout sub-group partition 200LB", which is converted from the fourth netlist, to obtain the second hierarchical layout corresponding to function B.

In some other embodiments, the method 400 may then proceed to performing a second verification on the second hierarchical layout. In some embodiments, the second verification comprising the design rule check DRC2 and/or the layout-versus-schematic LVS2 are performed on the second hierarchical layout.

Afterwards, as shown in FIG. 5, the method 500 proceeds to step S514 where the first hierarchical netlist and the second hierarchical netlist are merged to obtain a merged hierarchical netlist. As shown in FIG. 6, in some embodiments, the merged hierarchical netlist may correspond to the single physical layout.

In some other embodiments, the integrated circuit may further comprise a second die mounted on the interposer. In some other embodiments, the method 500 may further comprise obtaining a fifth netlist corresponding to a second die having the first function (e.g. function A) and the second function (e.g. function B) after step S504. As shown in FIG. 6, in some embodiments, the fifth netlist can be converted into the corresponding second layout sub-group 400L using tools (such as CAD tools). The second layout sub-group 400L corresponds to the layouts of the second die 400, for example, a memory die, as shown in FIG. 1.

Afterwards, the method 500 may further comprise partitioning the fifth netlist according to the first function (e.g. function A) during step S506. As shown in FIG. 6, in some embodiments, the third netlist may be converted into the corresponding first layout sub-group partition 300LA, the second layout sub-group partition 400LA' and the third layout sub-group partition 200LA".

Afterwards, the method 500 may further comprise partitioning the fifth netlist according to the second function (e.g. function B) during step S508. As shown in FIG. 6, in some embodiments, the fourth netlist be converted into the corresponding first layout sub-group partition 300LB, the second layout sub-group partition 400LB' and the third layout sub-group partition 200LB".

Compared with the conventional physical design framework for a 2.5D/3D integrated circuit, embodiments of the method of designing an integrated circuit has the advantage of the simultaneously designing for the layouts of the dies with the interposer and the TSVs. The layouts of the dies with the interposer and the TSVs can be modularized by partitioning the layouts according to function. Therefore, each of the stacked integrated circuit layout modules can be verified in parallel. Embodiments of the method of designing an integrated circuit can handle complicated hierarchical designs. Therefore, the goals of the faster design cycle and the increased design quality can be achieved.

While the invention has been described by way of example and in terms of the embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A computer-implemented method of designing a stacked integrated circuit having an interposer and at least a first die disposed upon the interposer, wherein, a portion of the first die and a portion of the interposer have the same function, the method comprising:
    providing a physical layout group, comprising:
        a first layout corresponding to the first die having both a first function and a second function, the second function being different from the first function; and
        a second layout corresponding to the interposer configured for the first die connected thereon;
    partitioning the physical layout group into a first physical layout partition corresponding to the first function, wherein the first physical layout partition is composed of the portion of the first layout and the portion of the second layout having the first function;
    performing a first automatic place-and-route (APR) process to obtain a first hierarchical layout according to the first physical layout partition;
    verifying the first hierarchical layout to obtain a verified first hierarchical layout by using a first verification, wherein the verification of the portion of the first die and the portion of the interposer having the same function is performed in parallel;
    partitioning the physical layout group into a second physical layout partition according to the second function;
    performing a second automatic place-and-route (APR) process to obtain a second hierarchical layout according to the second physical layout partition;
    performing a second verification on the second hierarchical layout; and
    merging the first hierarchical layout and the second hierarchical layout to obtain a single physical layout of a stacked integrated circuit device comprising the first die, the second die and the interposer; and
    performing a third verification on the single physical layout; and
    fabricating the integrated circuit based on the verified first hierarchical layout.

2. The method as claimed in claim 1, wherein the physical layout group comprises a third layout corresponding to the second function of a second die, wherein the second die has the first function and the second function, wherein the interposer is configured for the second die beside to the first die connected thereon, wherein the third layout has the first function and the second function.

3. The method as claimed in claim 2, wherein the first die comprises a system on chip (SoC) die, and the second die comprises a memory die.

4. The method as claimed in claim 2, wherein the physical layout group comprises a fourth layout corresponding to the second die having a sub-function of the first function, and wherein the fourth layout corresponds to the first layout.

5. The method as claimed in claim 4, wherein first physical layout partition comprises the first layout, the fourth layout and a portion of the second layout.

6. The method as claimed in claim 2, wherein the physical layout group comprises a fifth layout for a third die stacked on the second die having the second function.

7. The method as claimed in claim 6, wherein second physical layout partition comprises the third layout, the fifth layout and a portion of the second layout.

8. The method as claimed in claim 1, wherein the second layout comprises a placement design for through hole vias (TSVs) passing through the interposer.

9. The method as claimed in claim 1, wherein the first layout comprises a placement design for bump structures of the first die, wherein the first die connects to the interposer through the bump structures.

10. The method as claimed in claim 1, wherein the second physical layout partition comprises the third layout and a portion of the second layout.

11. The method as claimed in claim 1, wherein performing the first, second and third verifications comprises performing at least one of a design rule check (DRC) or a layout-versus-schematic (LVS).

* * * * *